(12) United States Patent
Thole et al.

(10) Patent No.: US 7,858,005 B2
(45) Date of Patent: Dec. 28, 2010

(54) METHOD FOR THE PRODUCTION OF FIRE-RESISTANT WOOD FIBER MOLDINGS

(75) Inventors: Volker Thole, Braunschweig (DE); Dirk Kruse, Braunschweig (DE)

(73) Assignee: Fraunhofer-Gesellschaft zur Förderung der angewandten Forschung e. V., München (DE)

( * ) Notice: Subject to any disclaimer, the term of this patent is extended or adjusted under 35 U.S.C. 154(b) by 839 days.

(21) Appl. No.: 10/526,541

(22) PCT Filed: Sep. 2, 2003

(86) PCT No.: PCT/DE03/02926

§ 371 (c)(1),
(2), (4) Date: Mar. 3, 2005

(87) PCT Pub. No.: WO2004/024824

PCT Pub. Date: Mar. 25, 2004

(65) Prior Publication Data

US 2006/0163769 A1    Jul. 27, 2006

(30) Foreign Application Priority Data

Sep. 6, 2002    (DE) ............................. 102 41 242

(51) Int. Cl.
*D04H 1/42*    (2006.01)
(52) U.S. Cl. ..................... 264/122; 264/115; 264/123
(58) Field of Classification Search .......... 264/122–128
See application file for complete search history.

(56) References Cited

U.S. PATENT DOCUMENTS

| | | | | |
|---|---|---|---|---|
| 4,761,342 A | | 8/1988 | Bjorhaag et al. | |
| 4,820,345 A | * | 4/1989 | Berg et al. | 106/18.12 |
| 4,902,445 A | * | 2/1990 | Bjorhaag et al. | 252/607 |
| 5,017,319 A | * | 5/1991 | Shen | 264/124 |
| 2002/0100996 A1 | * | 8/2002 | Moyes et al. | 264/122 |

FOREIGN PATENT DOCUMENTS

| | | | |
|---|---|---|---|
| DE | 1127270 | | 2/1961 |
| DE | 1127270 | * | 4/1962 |
| DE | 2523537 | | 5/1975 |
| DE | 3302841 A1 | | 1/1983 |
| DE | 4402912 A1 | | 1/1994 |
| DE | 19500653 A1 | | 1/1995 |
| DE | 19517905 A1 | | 5/1995 |
| DE | 19500653 A1 | * | 7/1996 |
| DE | 19927706 A1 | | 6/1999 |
| DE | 19933947 A1 | | 7/1999 |
| WO | PCT/SE91/00570 | | 8/1991 |
| WO | WO 9204169 A1 | * | 3/1992 |

* cited by examiner

*Primary Examiner*—Jennifer K Michener
*Assistant Examiner*—Magali P Slawski
(74) *Attorney, Agent, or Firm*—Whitham Curtis Christofferson & Cook, PC

(57) ABSTRACT

The invention relates to a method for the production of fire-resistant dense moulded pieces made from wood fibers, mixed with water glass as a binding flame-protection agent at a temperature above ambient temperature. A non-woven fiber formed from the above mixture is compressed to a density of <350 kg/m$^3$ and then the hardening of the binding flame protection agent carried out in a closed press in the compressed state at temperatures above 80° C.

7 Claims, No Drawings

METHOD FOR THE PRODUCTION OF FIRE-RESISTANT WOOD FIBER MOLDINGS

The invention relates to a method for the production of dense fire-resistant moldings from wood fiber or other lignocellulosic fibrous materials or particles.

Fiberboards made of wood or other plants containing lignocellulose are known per se. Depending on the production method (wet method, semidry method, dry method) and density the fiberboards are divided into porous fiberboards, semihard fiberboards or hard fiberboards or, in the dry method, into low density fiberboard (LDF), medium density fiberboard (MDF) and high density fiberboard (HDF). The common factor in all the production methods in which wood is used as a raw material is that the chips produced are initially prepared in a thermomechanical process to form fibers.

In the wet method, a suspension with a solids content of 1.5% to 3% is produced from the fibrous materials and water, from which a fiber nonwoven is formed via a fourdrinier or vat machine. The fiber nonwoven is then dewatered. In the production of porous fiberboard, only slight compaction is carried out before the drying, in order to ensure a uniform board thickness. In the case of "harder" fiberboards, a hard pressing operation is necessary for the desired increase in density and for thickness adjustment. As a result of the high fiber moisture before the hot pressing, an adequately strong fiber composite can be produced with no or with only small proportions of binder. Hydrothermal conditions under the hot press effect activation of binders inherent in the wood.

These necessary hydrothermal conditions are not present during the production of conventional LDF, MDF or HDF. An organic binder is therefore used to bond the fibers adhesively. In order to avoid the formation of agglomerates, the binder is added in the blow line directly after the dispersion of fibers in the refiner, before the fiber drying. The bonding time of organic binders depends on temperature; accelerated curing begins above 60° C. Consequently, a starting reaction of the binder should be expected during the fiber drying. In order to compensate for the losses in binding capacity occurring in this case, a higher degree of sizing must be chosen. The sized and dried fibrous materials are subsequently spread out, precompacted and pressed in a hot press to form a board.

The undesired loss of binder is avoided by special mixer configurations. Plants of this type are specifically suitable for agglomerate-free dry sizing of fibrous materials. In order to ensure a reliable function of these mixers, frequent cleaning is necessary. In addition, according to previous experience, a completely agglomerate-free fibrous material cannot be produced.

Furthermore, it is known to produce a fiberboard without binders by the dry method. In this case, in a manner compatible with the wet method, the fiber composite is intended to be produced by the activation of bonding forces inherent in the wood. The disadvantage with this method is the very long pressing time. The economic advantage of a saving in binder is more than cancelled out by this. In addition, the boards are very dark, which restricts the ability to be coated with light coating materials. Furthermore, the density of these boards is disadvantageous for many applications. Moreover, the long pressing time leads to partial pyrolysis of the board and undesired emissions are the result.

Under specific assumptions (density>400 kg/M$^3$, thickness>5 mm), all fiberboards are merely classified as normally flammable without further testing.

Board materials in fireproofing class A2 (non-combustible) require high proportions of inorganic binder. These boards come onto the market as plasterboards, gypsum-bonded particle boards, cement-bonded particle boards or cement-bonded fiberboards. For the classification into fireproofing class A2, from experience the proportion of inorganic constituents must not be greater than 20%. These high proportions of binder lead to a fundamentally different structure from that in classic fiberboards. The organic constituents are not bonded adhesively to one another but are incorporated in a matrix. In this case, this is rather more reinforcement than structure-forming functional elements. The bonding of these binders takes place as a result of crystal formation or the formation of solid gels (hydration). Because of the process, more and more water has to be used during production than is stoichiometrically necessary for the crystal formation. All the boards are dried industrially following bonding.

Organically bonded board materials in fireproofing classes B1 and A2 are also known. These properties can be achieved, however, only if flameproofing agents or fireproofing agents are added in addition to the combustible organic binders. Flameproofing agents are chemical substances which either reduce the flammability and/or combustibility or increase the fire resistance period of the material or the component. This can be achieved by the following chemical and/or physical processes:

- reducing the supply of heat by adding substances which break down in a highly endothermal process and do not produce combustible gases in the process, which additionally damp down the flames (for example aluminum, magnesium hydroxide). Energy-consuming fireproofing agents.
- smothering the flames by developing chemical substances which bind the H and OH radicals. Fire-smothering fireproofing agents.
- limiting the flow of heat by creating an insulating layer at the surface. Fireproofing agents which promote charring, the formation of barrier layers and insulating layers.

Fireproofing agents are in this case applied either as a protective paint or as an impregnation or additive (in the case of wooden materials). In general, fireproofing agents nowadays function in accordance with a plurality of these principles.

The necessary additives usually increase the product-related material costs. Furthermore, in the case of the usual additives, there are changes in the pH and in the alkali buffer capacity. Undesired changes in the curing behavior of the organic binders result. If sufficient curing for the desired strength of the material does not take place at all, given the necessary quantities of additives, very long pressing times are required. This restricts the economic production of such board materials considerably. In addition, the particularly effective fireproofing agents are ecologically suspect, since they contain halogen compounds. Halogen-free fireproofing agents have to be used at particularly high dosage rates because of their restricted effectiveness.

In addition to the inorganic binders curing by crystallization, those which comprise water-soluble potassium or sodium silicates (water glasses) are also known. Water glasses are used in many industrial sectors. For example, they can be used as a gas drying agent and also as a basis for water-glass inks. Water glasses are used as auxiliary or active substances in the production of paper fibers, soap production and ground consolidation. Water glasses also exhibit a high flameproofing action. In conjunction with the production of wood or fibrous materials, methods are known in which water glasses are used for the production of insulating materials, that is to say materials with a very high bulk density. However, water glasses form a binding characteristic with respect to lignocellulose-containing fibers or particles only in materials with a low bulk density. Only under these conditions is sufficient curing and bonding action to the fibers possible, since only given the high porosity characteristic of the insulating materials is the carbon dioxide of the air accessible to the water glass.

Consequently, construction materials with high strengths, such as are required in furniture construction and building, cannot be produced with pure water glass without additional or inorganic binders. In dense materials, in these cases the water glass merely has to function as a flameproofing agent. Methods with water glasses as flameproofing agents and additional binders therefore have the same disadvantage as all the methods in which, in addition to the binders, for the fireproofing action further substances have to be added to the board materials. In addition to the considerable cost for the additives and the high expenditure of the mixing technology, the detrimental effect on the binder curing is particularly disadvantageous.

The replacement of fireproof fibrous materials with inorganic binders by those with inorganic binders is expedient only for a few areas of use. In addition, given an optimized composition, the mechanical properties required in many cases cannot be maintained. They are therefore not suitable for fiber moldings in vehicle construction and for furniture parts. Fibrous materials with inorganic binders have a considerably higher density because of the material. The associated relatively good thermal conductivity is undesired in building since, as a result, the necessary thermal insulation has to be designed to be thicker.

The invention is based on the object of specifying a method for the cost-effective production of dense fire-resistant moldings from wood fibers or other lignocellulosic fibrous materials or particles ("fibrous materials" below).

According to the invention, this object is achieved in that, in the dry method, inorganic materials ("water glass" below) based on potassium and/or sodium silicates are added to the fibrous materials at a mixing temperature of 30° C.-95° C., preferably of 40° C.-75° C., and in which a fibrous nonwoven is formed from this mixture, is compressed to a density of 350 kg/m$^3$-1250 kg/m$^3$ and is cured in a closed press in the compressed state at a temperature above 80° C.

Based on the same inventive principle, the above-mentioned object is also achieved in that, under a water vapor atmosphere, inorganic substances ("water glass" below) based on potassium and/or sodium silicates are added to the fibrous materials at a mixing temperature of 105° C.-180° C., preferably 110° C-150° C., and in which a fibrous nonwoven is formed from this mixture, is compressed to a density of 350 kg/m$^3$-1250 kg/m$^3$ and is cured in a closed press in the compressed state at a temperature above 80° C.

In this case, the fibrous nonwoven to be compressed has a fiber moisture less than 25%. The compression of the fibrous nonwoven in the hot press is carried out without any through flow of gas or the entry of atmospheric carbon dioxide.

With the method according to the invention mentioned at the first point above, for example a fire-resistant fibrous material having a density of 750 kg/m$^3$ usual for MDF can be produced without the additional organic binders, even in the dry method. In the case of mixtures of fibrous substances with water-containing binders, agglomerates are normally produced. The cause of this agglomerate formation is the tendency of the fibers to felt, which increases with increasing fiber moisture. Furthermore, the tack of organic binders then leads to fixing and permanent agglomerate formation. Highly viscous, low-water binders or powdered binders certainly put less moisture into the mixture but cannot be distributed adequately well. In order to prevent the formation of agglomerates, it would therefore be desirable if, during the dry sizing, the binder water necessary for the distribution could at the same time be driven out again by means of industrial drying. The increasing temperature needed for this purpose in the case of normal organic binders leads to undesired pre-curing. In the case of the use of water glass according to the invention, the mixing operation can be carried out at a higher temperature without the risk of pre-curing. Since, furthermore, water glass does not exhibit any pronounced tack, the mixing result is largely agglomerate-free.

With the use according to the invention of water glass, more effective sizing under a water vapor atmosphere also becomes possible. As distinct from organic binders, in which, in the event of binder being put in before the fiber drying (wet sizing) a loss of binding capacity through the drying has to be tolerated, no loss of binding capacity occurs in the case of water glass. In the case of organic binders and wet sizing, the highest possible solids contents in the binders are beneficial. The useful input of water increases the necessary drying energy (drying temperature, drying time). Since more intense pre-curing takes place as a result, the binding capacity and, consequently, also the material strength decrease. A high solids concentration should than be aimed at even if an optimum binder distribution is not established as a result. The large insensitivity of water glass to the effects of temperature, by contrast, permits a solids concentration which can be chosen freely in relation to the optimum glue distribution.

In this case, it is expedient if at least a proportion of the total quantity of water glass to be added is added to the chips intended for the production of the fibrous materials before and/or during their defibering. In this case, the water glass can be fed directly into the cooking process disintegrating the fibrous materials or into a transport element of a refiner defibering the chips.

The method specified here with water glass is particularly advantageous in the event of planned or unplanned production interruptions. The fibrous materials sized with organic binders in the wet method can be kept only to a limited extent (open time). For example, the mechanical properties of fiberboards decrease noticeably if the fibers are pressed after a waiting time of more than 2 h after sizing. During the production of moldings, fiber mats are predominantly produced first, which are cut to size and then processed in a molding press. For production technical reasons, there can be several weeks between the production of mats or nonwovens and the production of moldings. Hitherto, this has been possible only with expensive binders based on phenolic resin. However, the time interval should not be more than 4 weeks, even in this case. In the case of water-glass sizing according to the invention, no decrease in the mechanical properties has been determined, even after a storage time of 12 weeks.

According to the invention, with the water-glass sizing, fiberboards can be produced with a density and strength required for construction materials and, furthermore, also have good fire engineering properties. As distinct from other methods, an additive is not required.

The proportion of binder-flameproofing agent can be variably high according to the invention, the water glass being added to the fibrous materials in an amount of 5%-40%, preferably 10%-30%, based on absolutely dry fibrous materials. Thus, it is possible, with a low bulk density of about 400 kg/M$^3$ and a binder-flameproofing agent proportion of 25%, to meet the requirements of fireproofing class B1. At higher bulk densities>680 kg/m$^3$ binder-flameproofing agent proportions<15% are adequate for the same fireproofing class. If, in addition to the fire properties, particular requirements are placed on the mechanical or hygric properties, the proportion of the binder-flameproofing agent can be adapted appropriately to the requirements. The fire properties and mechanical properties are determined only by the density and the proportion of binder-flameproofing agent in this method. Chemical interactions between an organic binder and a flameproofing agent do not have to be taken into account in the method according to the invention. Thus, by means of appropriate quantities of additives, an additional flameproofing action can be achieved without the binding mechanism of an organic binder being impaired. The technical method parameters do not depend on the desired properties of the material. The method is therefore particularly economical.

According to the invention, a water-glass adhesive can be used which has additives and active substances mixed with the water glass, such as fillers, pigments, wetting agents and the like. If a water-glass adhesive is used, the result is an improved ability to be processed, increased adhesion properties and an improved water resistance.

In addition, for the purpose of faster curing, conventional additives and active substances can be added to the water glass before or after its addition to the fibrous materials, preferably consisting of acid formers, in particular carbon dioxide formers. Usual auxiliaries and active materials are fillers, pigments, wetting agents, stabilizers, rheological additives and hardeners.

The methods according to the invention will be explained in more detail below by using exemplary embodiments.

Exemplary Embodiment 1

De-barked spruce wood stored in the open was first comminuted by means of a drum chipper to form chips. The chips were then ground continuously in a refiner (cooking temperature 150° C., cooking time 5 min) to form fibrous materials. Immediately after the production of the fibers, 12% UF resin, based on absolutely dry fibers, was added to the fiber stream in the blow line. After drying in a tubular dryer, a fiber nonwoven was formed which was then pre-compressed with a cold press. At a pressing temperature of 200° C. and with a specific pressing time of 12 s/min, board with a thickness of 5 mm and a density of 800 kg/m$^3$ was produced from the precompressed fiber nonwoven.

The board had a bending strength of 38.5 N/mm$^2$ and a transverse tensile strength of 0.95 N/mm$^2$. In order to characterize the fire characteristics, a modified text according to DIN 4102 for materials in fireproofing class B2 was used. As distinct from the defined flame exposure time of 15 s, the flame exposure was carried out at least until the measuring mark was reached. In the case of this board, the measuring mark was reached after 3.6 min, the sample was largely destroyed after 10 min flame exposure. The example continued to burn even after the source of ignition had been removed.

Exemplary Example 2

A fibrous material produced as in example 1 without binder had 10% potassium water glass or sodium water glass in each case added at a mixing temperature of 35° C. in a plug shear mixer. The board materials produced as in example 1 had a bending strength of 24.5 N/mm$^2$ and a transverse tensile strength of 0.43 N/mm$^2$ with potassium water glass, and a bending strength of 16.7 N/mm$^2$ and a transverse tensile strength of 0.22 N/mm$^2$ with sodium water glass. The measuring mark in the fire test was reached only after 8.3 min (potassium water glass) and 8.1 min (sodium water glass). Without a source of ignition, the sample did not continue to burn independently.

Exemplary Embodiment 3

A board as in example 2 but with 20% potassium water glass exhibited a bending strength of 34.2 N/mm$^2$ and a transverse tensile strength of 0.75 N/mm$^2$. The measuring mark in the fire test was reached after 11.5 min. Without any source of ignition, the sample did not continue to burn independently.

Exemplary Embodiment 4

Instead of the UF resin used in exemplary embodiment 1, potassium water glass (20% on absolutely dry fiber) was added to the fibrous material in the blow line at a temperature of 125° C. The fiberboard, produced as in sample 1, has a bending strength of 36 N/mm$^2$ and a transverse tensile strength of 0.92 N/mm$^2$. The measuring mark in the fire test was reached after 13.3 min. Without any source of ignition, the sample did not continue to burn independently.

The invention claimed is:

1. A method for the production of dense fire-resistant moldings from fibrous materials consisting of wood fibers or other lignocellulosic fibrous materials or particles, in which, under a water vapor atmosphere in a blow line, inorganic solutions based on potassium and/or sodium silicates are added to the fibrous materials at a mixing temperature of 105° C.-180° C., and in which a fibrous non-woven is formed from this mixture, is then compressed to a density of 350 kg/m$^3$-1250 kg/m$^3$, and is cured in a closed press in the compressed state at a temperature above 80° C.

2. The method as claimed in claim 1, characterized by a mixing temperature of 110° C.-150° C.

3. The method as claimed in claim 1, characterized in that the fibrous non-woven to be compressed has a fiber moisture of <25%.

4. The method as claimed in claim 1, characterized in that the inorganic substances are added to the fibrous materials in an amount of 5%-40% based on absolutely dry fibrous materials.

5. The method as claimed in claim 1, characterized in that at least a proportion of the total quantity of inorganic substances to be added is added to chips intended for the production of the fibrous materials before and/or after their defibering.

6. The method as claimed in claim 1, characterized in that at least part of the total amount added of said inorganic substances is added a transport element of a defibering apparatus.

7. The method as claimed in claim 1, characterized in that, for the purpose of faster curing, auxiliary and active substances are added to the inorganic substances before or after its addition to the fibrous materials.

\* \* \* \* \*